US012617696B2

(12) United States Patent
Paulsen et al.

(10) Patent No.: US 12,617,696 B2
(45) Date of Patent: May 5, 2026

(54) POWDEROUS LITHIUM COBALT-BASED OXIDE CATHODE ACTIVE MATERIAL POWDER FOR RECHARGEABLE LITHIUM ION BATTERIES AND A METHOD FOR MAKING THEREOF

(71) Applicant: UMICORE, Brussels (BE)

(72) Inventors: Jens Paulsen, Chungcheongnam-do (KR); KyeongSe Song, Chungcheongnam-do (KR)

(73) Assignee: UMICORE, Brussels (BE)

( * ) Notice: Subject to any disclaimer, the term of this patent is extended or adjusted under 35 U.S.C. 154(b) by 834 days.

(21) Appl. No.: 17/783,339

(22) PCT Filed: Dec. 1, 2020

(86) PCT No.: PCT/EP2020/084040
§ 371 (c)(1),
(2) Date: Jun. 8, 2022

(87) PCT Pub. No.: WO2021/121950
PCT Pub. Date: Jun. 24, 2021

(65) Prior Publication Data
US 2023/0040464 A1 Feb. 9, 2023

(30) Foreign Application Priority Data
Dec. 18, 2019 (EP) ..................................... 19217373

(51) Int. Cl.
H01M 10/0525 (2010.01)
C01G 51/42 (2025.01)
(52) U.S. Cl.
CPC ........ C01G 51/42 (2013.01); H01M 10/0525 (2013.01); C01P 2006/40 (2013.01)

(58) Field of Classification Search
CPC ... H01M 10/0525; C01G 1/42; C01P 2006/40
See application file for complete search history.

(56) References Cited

U.S. PATENT DOCUMENTS

2017/0179479 A1 6/2017 Park et al.
2017/0309909 A1* 10/2017 Paulsen .................. C01G 53/50
(Continued)

FOREIGN PATENT DOCUMENTS

JP 1997245787 A 9/1995
JP 2001273898 A 10/2001
(Continued)

OTHER PUBLICATIONS

ISA/EP; International Search Report and Written Opinion for International Patent Application No. PCT/EP2020/084040 dated Feb. 24, 2021, 9 pages.
(Continued)

*Primary Examiner* — Kimberly Wyluda
(74) *Attorney, Agent, or Firm* — Rimon P.C.; Allyn B. Elliott

(57) ABSTRACT

A lithium cobalt-based oxide cathode active material powder having: —a primary phase comprising Li, Co, and O, and—a secondary phase comprising $LiNaSO_4$, wherein the content of said $LiNaSO_4$ secondary phase in said powder is of at least 0.4 wt. % and inferior or equal to 1.1 wt. % with respect to a total weight of the cathode active material powder, said cathode active material powder being characterized in that it has a S/Na atomic ratio superior or equal to 0.80 and inferior or equal to 1.20.

11 Claims, 4 Drawing Sheets

(56)  References Cited

U.S. PATENT DOCUMENTS

| 2019/0237548 A1 | 8/2019 | Koyama et al. |
| 2019/0296339 A1 | 9/2019 | Park et al. |

FOREIGN PATENT DOCUMENTS

| JP | 2001297768 | A | 10/2001 |
| JP | 2004006229 | B2 | 1/2004 |
| JP | 2017021942 | B2 | 1/2017 |
| JP | 2017506805 | A | 3/2017 |
| JP | 2017536654 | A | 12/2017 |
| KR | 20170074624 | A | 6/2017 |
| WO | 2004040677 | A1 | 5/2004 |
| WO | 2015128722 | A1 | 9/2015 |
| WO | 201816165 | A1 | 1/2018 |
| WO | 2018162165 | A1 | 9/2018 |

OTHER PUBLICATIONS

WIPO; International Preliminary Report on Patentability for International Patent Application No. PCT/EP2020/084040 dated Apr. 28, 2021, 13 pages.

Korean IPO: Office Action in Korean Patent Application No. 10-2022-7024709 corresponding to PCTEP2020084040, mailed Nov. 13, 2024, 9 pages.

Korean IPO: Office Action in Korean Patent Application No. 10-2022-7024709 corresponding to PCTEP2020084040, mailed Nov. 13, 2024, English Translation, 9 pages.

* cited by examiner

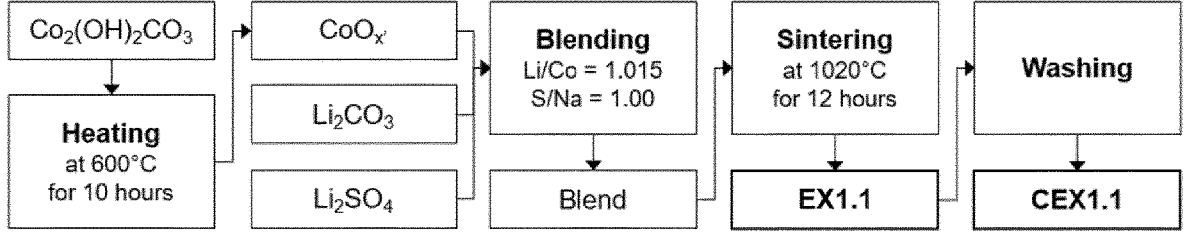
Figure 1.1
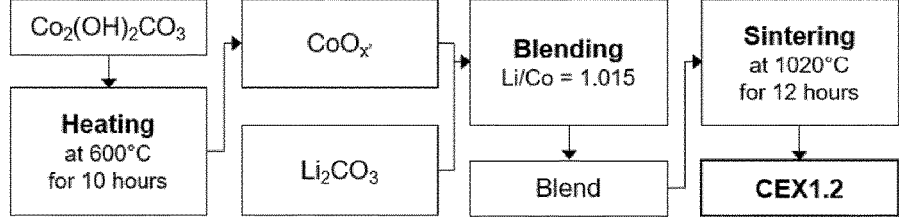
Figure 1.2

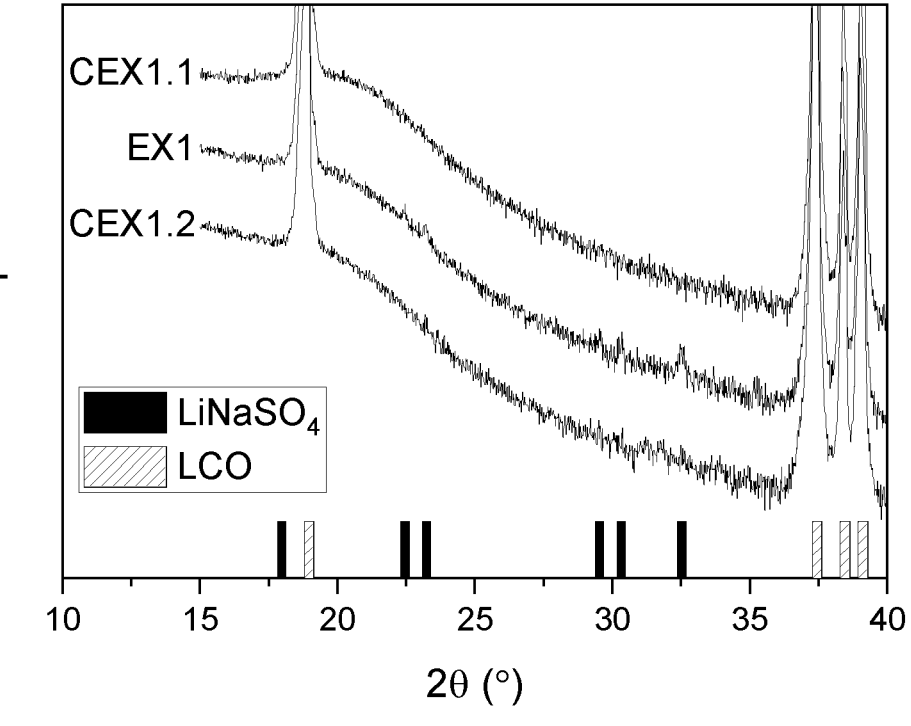
Figure 2.1
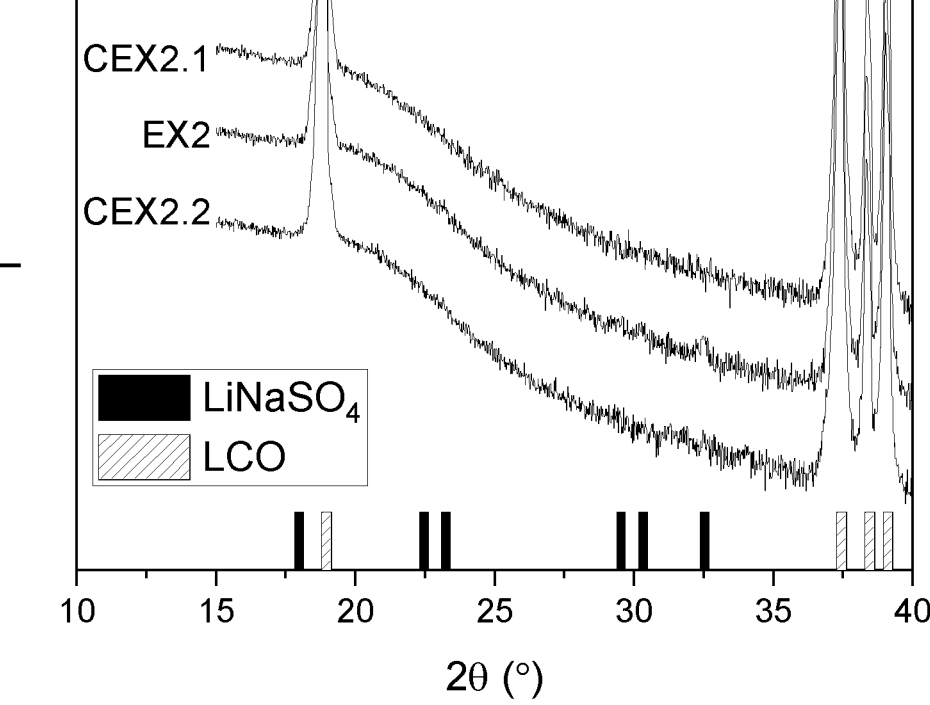
Figure 2.2

1

POWDEROUS LITHIUM COBALT-BASED OXIDE CATHODE ACTIVE MATERIAL POWDER FOR RECHARGEABLE LITHIUM ION BATTERIES AND A METHOD FOR MAKING THEREOF

CROSS-REFERENCE TO RELATED APPLICATIONS

This application is a U.S. National Stage application of International Patent Application No. PCT/EP2020/084040, filed on Dec. 1, 2020, which claims the benefit of European Patent Application No. 19217373.0, filed on Dec. 18, 2019.

TECHNICAL FIELD AND BACKGROUND

This invention relates to a lithium cobalt-based oxide (LCO) cathode active material powder for lithium-ion secondary batteries (LIBs) suitable for (portable) electronic device applications, comprising particles having:

a primary phase comprising Li, Co, and O, and a secondary phase comprising $LiNaSO_4$.

By LCO cathode active material it is understood in the context of the presented invention that such a material has an atomic ratio of Co to transition metals in said powder is of at least 85 mol %.

In the framework of the present invention, it must be understood that if the particles of the LCO material have said primary and secondary phases, that means that the LCO powder has these said primary and secondary phases.

Such a cathode active material powder is already known, for instance, from the document US 2017/0179479 A1 which discloses a material having a core comprising the primary phase $LiCoO_2$ and a coating layer on top of the core comprising the secondary phase $LiNaSO_4$. The content of this secondary phase in the cathode active material powder varies in a range defined from 0.5 wt. % to 5 wt. % with respect to the total weight of the cathode active material powder. The cathode active material powder of US 2017/0179479 A1 presents a first discharge capacity (DQ1) of 217.6 mAh/g and a capacity fading rate (QF) of 0.79% per cycle obtained by the analytical methods of the present invention. The capacity fading rate (QF) per cycle should be improved.

WO2018/162165 also discloses a LCO cathode active material comprising 1.26 wt. % $LiNaSO_4$ and showing DQ1 of 204.6 mAh/g and QF of 0.69%/cycle. WO2018/162165 teaches to wash said LCO cathode active material. Water-washed LCO material according to this document comprises 0.05 wt. % $LiNaSO_4$ and shows poor cycle life.

It is therefore an object of the present invention to provide a LCO cathode active material powder for lithium-ion secondary batteries, having subsequently an improved DQ1 of at least 210 mAh/g and an improved QF of at less than 0.60% per cycle obtained by the analytical methods of the present invention.

SUMMARY OF THE INVENTION

This objective is achieved by providing a lithium cobalt-based oxide cathode active material powder according to claim 1, wherein the particles have a S/Na atomic ratio superior or equal to 0.80 and inferior or equal to 1.20.

It is indeed observed that an improved DQ1 of higher than 210 mAh/g and an improved QF of lower than 0.60%/cycle, as illustrated in the results provided in Table 2, are achieved in a LIBs using a LCO cathode active material powder according to EX1.1 having the following features:

an amount of a $LiNaSO_4$ compound of 0.54 wt. % with respect to the total weight of the cathode active material powder, and a S/Na atomic ratio of 1.01.

In the framework of the present invention, it must be understood that if the particles of the LCO material have the claimed range(s) of (wt. %) amounts of said $LiNaSO_4$ compound and the claimed range(s) of S/Na atomic ratios, that means that the LCO powder has these claimed ranges of (wt. %) amounts of said $LiNaSO_4$ compound and S/Na atomic ratios.

The cathode active material powder comprises a $LiNaSO_4$ compound superior or equal to 0.4 wt. % and inferior or equal to 1.1 wt. % with respect to the total weight of the cathode active material powder. If the amount of the $LiNaSO_4$ compound is less than 0.4 wt. % or higher than 1.1 wt. %, DQ1 decreases and the cycle life deteriorates.

In the framework of the present invention, the primary phase comprises Li, Co, and O. The primary phase has a first own crystalline structure (monocrystalline or polycrystalline).

The secondary phase comprises $LiNaSO_4$. The secondary phase has a second own crystalline structure (monocrystalline or polycrystalline).

The second compound is distinct from the first compound.

The present invention concerns the following embodiments:

Embodiment 1

In a first aspect, the present invention concerns a lithium cobalt-based oxide (LCO) cathode active material powder for lithium-ion secondary batteries (LIBs) suitable for (portable) electronic device applications, comprising:

a primary phase comprising Li, Co, and O, and a secondary phase comprising $LiNaSO_4$, wherein preferably said material has an atomic ratio of Co to transition metals in said powder is of at least 85 mol %.

The content of said $LiNaSO_4$ secondary phase in said powder is of at least 0.4 wt. % and inferior or equal to 1.1 wt. % with respect to a total weight of the cathode active material powder particles and S/Na atomic ratio superior or equal to 0.80 and inferior or equal to 1.20.

Preferably, in the Embodiment 1, the content of the $LiNaSO_4$ secondary phase is superior or equal to 0.50 wt. % and of at most 0.65 wt. % with respect to the total weight of the cathode active material powder.

More preferably, in the Embodiment 1, the S/Na atomic ratio of said cathode active material powder is superior or equal to 0.95 and inferior or equal to 1.05.

Optionally in the Embodiment 1, said primary phase comprises Al and Mg.

Preferably, the primary phase has a R-3m crystal structure whereas the secondary phase has more preferably a P31c crystal structure.

Optionally, the cathode active material powder according to Embodiment 1 comprises particles having a Li/Co atomic ratio superior or equal to 0.98 and inferior or equal to 1.02, preferably superior or equal to 1.000 and inferior or equal to 1.016.

In the framework of the present invention, it must be understood that if the particles of the LCO material have the claimed range(s) of Li/Co atomic ratio, that means that the LCO powder has these claimed ranges of Li/Co atomic ratio.

If the Li/Co atomic ratio is less than 0.98, a Co dissolution at a higher voltage such as 4.50V occurs and the capacity of the cathode active material powder decreases. If the Li/Co atomic ratio is more than 1.02, the cycle life of the cathode active material powder deteriorates.

Preferably, said primary phase has a monolithic or polycrystalline morphology. A monolithic morphology stands for a morphology of a single particle or of a secondary particle consisting of two or three primary particles, observed in proper microscope techniques like Scanning Electron Microscope (SEM). A powder is referred to as a monolithic powder in case 80% or more of the number of particles in a field of view of: at least 45 µm×at least 60 µm (i.e. of at least 2700 µm$^2$), preferably of: at least 100 µm×at least 100 µm (i.e. of at least 10000 µm$^2$), provided by SEM have the monolithic morphology. A polycrystalline morphology stands for a morphology of secondary particle consisting of more than three primary particles.

A cathode active material is defined as a material which is electrochemically active in a cathode. By active material, it must be understood a material capable to capture and release Li ions when subjected to a voltage change over a predetermined period of time.

Embodiment 2

In a second Embodiment, the cathode active material powder according to the Embodiment 1 has a first discharge capacity at 4.6V (Li$^+$/Li) of at least 210 mAh/g, preferably at most 240 mAh/g.

Embodiment 3

In a third Embodiment, the cathode active material powder according to the Embodiment 1 or 2 has a capacity fading rate at 4.6V (Li$^+$/Li) of at most 0.6%/cycle.

Embodiment 4

In a fourth Embodiment, the present invention is also inclusive of a first process for manufacturing the cathode active material powder according to the invention.

The first process according to the invention comprises the step of:
    providing a Co-based precursor powder having a Na content superior to 0.05 wt. % and inferior to 0.30 wt. % with respect to a total weight of said precursor powder, wherein said precursor optionally comprises M,
    mixing said Co-based precursor powder with a source of Li, a source of S, and optionally, with a source of M', so as to prepare a mixture having a Li/Co atomic ratio superior or equal to 0.98 and inferior or equal to 1.02 and a S/Na atomic ratio superior or equal to 0.80 and inferior or equal to 1.20,
    sintering said mixture at a temperature of at least 850° C. and inferior or equal to 1200° C., during a period of at least 5 hours in an oxygen containing atmosphere such as air, so as to obtain a sintered agglomerated powder, and
    milling said sintered agglomerated powder so as to obtain said cathode active material,
    wherein M and M' comprises at least one element of the group consisting of: Mg, Al, Ni, Mn, Nb, Ti, W, and Zr.

Embodiment 5

In a fifth Embodiment, the present invention is also inclusive of a second process for manufacturing the cathode active material powder according to the invention.

The second process according to the invention comprises the step of:
    providing a Co-based precursor powder having a S content superior to 0.05 wt. % and inferior to 0.30 wt. % with respect to a total weight of said precursor powder and a Na content superior to 0.05 wt. % and inferior to 0.30 wt. % with respect to a total weight of said precursor powder, wherein said precursor optionally comprises M,
    mixing said Co-based precursor powder with a source of Li, and optionally, with a source of M', so as to prepare a mixture having a Li/Co atomic ratio superior or equal to 0.98 and inferior or equal to 1.02 and a S/Na atomic ratio superior or equal to 0.80 and inferior or equal to 1.20,
    sintering said mixture at a temperature of at least 850° C. and inferior or equal to 1200° C., during a period of at least 5 hours in an oxygen containing atmosphere such as air, so as to obtain a sintered agglomerated powder, and
    milling said sintered agglomerated powder so as to obtain said cathode active material
    wherein M' comprises at least one element of the group consisting of: Mg, Al, Ni, Mn, Nb, Ti, W, and Zr.

Embodiment 6

In a sixth Embodiment, the present invention is also inclusive of a third process for manufacturing the cathode active material powder according to the invention.

The third process according to the invention comprises the step of:
    providing a Co-based precursor powder,
    mixing said Co-based precursor powder with a source of Li, a source of S and a source of Na, and optionally, with a source of M', so as to prepare a mixture having a Li/Co atomic ratio superior or equal to 0.98 and inferior or equal to 1.02 and a S/Na atomic ratio superior or equal to 0.80 and inferior or equal to 1.20,
    sintering said mixture at a temperature of at least 850° C. and inferior or equal to 1200° C., during a period of at least 5 hours in an oxygen containing atmosphere such as air, so as to obtain a sintered agglomerated powder, and
    milling said sintered agglomerated powder so as to obtain said cathode active material,
    wherein M' comprises at least one element of the group consisting of: Mg, Al, Ni, Mn, Nb, Ti, W, and Zr.

BRIEF DESCRIPTION OF THE FIGURES

FIG. 1.1: Schema of the preparation steps of the LCO materials according to EX 1.1.

FIG. 1.2: Schema of the preparation steps of the LCO materials according to CEX1.1.

FIG. 2.1: X-Ray diffractogram scan in a 2θ range from 15° to 40°, y-axis is intensity in a log scale.

FIG. 2.2: X-Ray diffractogram scan in a 2θ range from 15° to 40°, y-axis is intensity in a log scale.

DETAILED DESCRIPTION

Figure 3:
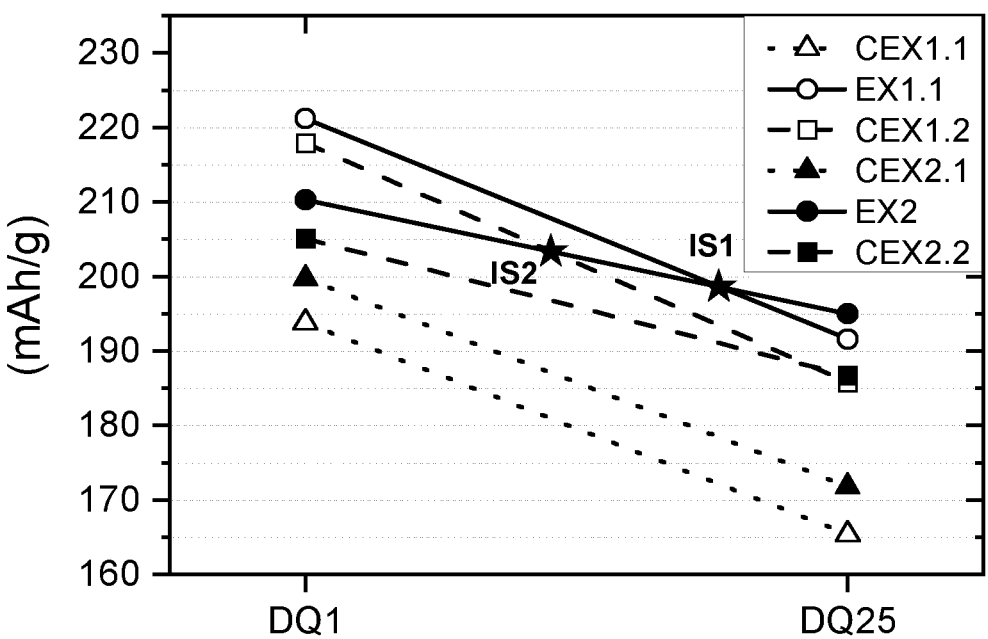
FIG. 3: Comparison of discharge capacity fading rates for EX1.1, CEX1.1, CEX1.2, EX2, CEX2.1, and CEX2.2.

The invention is further illustrated in the following examples:

1. Description of Analysis Methods 1.1. Inductively Coupled Plasma

The inductively coupled plasma (ICP) method is used to measure the content of elements such as Li, Co, Al, Mg, Na, and S by using an Agillent ICP 720-ES device.

2.0 g of the LCO cathode active material powder sample is dissolved in 10.0 mL of a hydrochloric acid solution (at least 37 wt. % of HCl with respect to the total amount of solution) in an Erlenmeyer flask. The flask is covered by a glass and heated on a hot plate until complete dissolution of the powder sample is achieved. After being cooled to the room temperature, the solution is moved to a 100 mL volumetric flask. The volumetric flask is filled with deionized water up to the 100 mL mark. 5 mL of the resulting solution is transferred into a 50 mL volumetric flask for a second dilution, wherein the volumetric flask is filled with 10% hydrochloric acid up to the 50 mL mark and then homogenized. Finally, this 50 mL solution is used in the ICP measurement.

The amount of LiNaSO$_4$ is stoichiometrically calculated from the ICP measurements of Na and S according to the equation (1) or (2) depending on which the limiting reagent is.

It means if the atomic content of Na measured with respect to the total molar contents of Co by ICP is lower than the atomic content of S with respect to the total molar contents of Co measured by ICP, then the Na element is considered as being the limiting reagent and equation (1) is used to calculate the weight content of the secondary phase LiNaSO$_4$.

Conversely, if the atomic content of S with respect to the total molar contents of Co measured by ICP is lower than the atomic content of Na with respect to the total molar contents of Co measured by ICP, then the S element is considered as the limiting reagent and equation (2) is used to calculate the weight content of the secondary phase LiNaSO$_4$.

$$LiNaSO_4(wt. \%)=Na (at. \%)\times Molecular\ Weight\ of\ LiNaSO_4\ or \quad (1)$$

$$LiNaSO_4(wt \%)=S (at. \%)\times Molecular\ Weight\ of\ LiNaSO_4. \quad (2)$$

1.2. X-Ray Diffraction

The X-ray diffraction pattern of the cathode active material powder sample is collected with a Rigaku X-Ray Diffractometer (Ultima IV) using a Cu Kα radiation source (40 kV, 40 mA) emitting at a wavelength of 1.5418 Å. The instrument configuration is set at: a 1° Soller slit (SS), a 10 mm divergent height limiting slit (DHLS), a 1° divergence slit (DS) and a 0.3 mm reception slit (RS). The diameter of the goniometer is 158 mm. Diffraction patterns are obtained in the 2θ range from 15° to 40° with a scan speed of 0.1° per minute and a step-size of 0.02° per scan.

1.3. Electrochemical Analysis 1.3.1. Coin Cells Preparation

Coin cells are assembled according to the following protocol:

Step 1) Preparation of a Cathode:

A slurry that contains: the LCO cathode active material powder, a conductor (Super P, Timcal) and a binder (KF #9305, Kureha) in a weight ratio 90:5:5, and a solvent (NMP, Sigma-Aldrich) are mixed in a high-speed homogenizer so as to obtain a homogenized slurry. The homogenized slurry is spread on one side of an aluminum foil using a doctor blade coater with a 230 μm gap. the slurry-coated aluminum foil is dried in an oven at 120° C., then pressed using a calendaring tool, and dried again in a vacuum oven to remove the solvent completely.

Step 2) Coin Cell Assembly:

A coin cell is assembled in a glovebox which is filled with an inert gas (argon). For the discharge capacity analysis, a separator (Celgard) is located between the cathode and a piece of lithium foil used as an anode. 1M LiPF$_6$ in EC:DMC (1:2 in volume) is used as electrolyte and dropped between separator and electrodes. Then, the coin cell is completely sealed to prevent leakage of electrolyte.

1.3.2. Testing Method

Each coin cell is cycled at 25° C. using Toscat-3100 computer-controlled galvanostatic cycling stations (from Toyo). The coin cell testing schedule used to evaluate samples is detailed in Table 1. The schedules use a 1C current definition of 185 mA/g. The first discharge capacity DQ1 are measured in constant current mode (CC). The capacity fading rate (QF) is obtained according to below equation.

$$QF(\%/cycle) = \left(1 - \frac{DQ_{25}}{DQ_1}\right) \times \frac{1}{24} \times 100$$

wherein DQ1 is the discharge capacity at the first cycle and DQ25 is the discharge capacity at the 25th cycle.

TABLE 1

| | Charge | | | | Discharge | | | |
|---|---|---|---|---|---|---|---|---|
| Cycle | C Rate | End current | Rest (min) | V/Li metal (V) | C Rate | End current | Rest (min) | V/Li metal (V) |
| 1 | 0.25 | 0.1 C | 10 | 4.6 | 0.10 | — | 10 | 3.0 |
| 2 | 0.25 | 0.1 C | 10 | 4.6 | 1.00 | — | 10 | 3.0 |
| 3~24 | 0.50 | 0.1 C | 10 | 4.6 | 0.50 | — | 10 | 3.0 |
| 25 | 0.25 | 0.1 C | 10 | 4.6 | 0.10 | — | 10 | 3.0 |
| 26 | 0.25 | 0.1 C | 10 | 4.6 | 1.00 | — | 10 | 3.0 |

Coin cell testing schedule 1.4. Particle Size Distribution

The particle size distribution (psd) such as a median particle size in volume (D50) is obtained by a laser psd measurement method. In this invention, the laser psd is measured using a Malvern Mastersizer 3000 with Hydro MV wet dispersion accessory, after dispersing the powder in an aqueous medium. In order to improve the dispersion of the powder in the aqueous medium, sufficient ultrasonic irradiation and stirring are applied and an appropriate surfactant is introduced.

2. EXAMPLES AND COMPARATIVE EXAMPLES

FIG. 1.1 shows the manufacturing process of EX1.1 and CEX1.1 while FIG. 1.2 shows that of CEX1.2.

Example 1.1

A cobalt hydroxide carbonate precursor having a general formula Co$_2$(OH)$_2$CO$_3$ is prepared by the process described in WO2018/162165 from page 5 line 4 to page 6 line 14. The process comprises the steps of mixing a $CoSO_4$ and a $Na_2CO_3$ solution in a precipitation reactor with a controlled temperature and pH. By using $CoSO_4$ solution as the cobalt source during preparation of $Co_2(OH)_2CO_3$, a side product $Na_2SO_4$ is also formed, possibly according to the following chemical reaction: $2CoSO_4+Na_2CO_3+2NaOH$—$Co_2(OH)_2CO_3+2Na_2SO_4$.

The precursor in this invention, which is prepared according to the above-described process, has a median particle size of 20 μm and a Na content of 0.11 wt. %. The cobalt hydroxide carbonate is heated at 600° C. for 10 hours so as to prepare a cobalt oxide. The cobalt oxide is mixed with a $Li_2CO_3$ powder and a $Li_2SO_4$ powder so as to prepare a blend wherein the Li/Co atomic ratio is 1.00 and the S/Na atomic ratio is 1.00. The blend is fired (or sintered) at 1020° C. for 12 hours in a furnace so as to prepare a sintered powder. The sintered powder is de-agglomerated and screened by a milling equipment and sieving tool so as to prepare a LCO cathode active material powder labelled as EX1.1. The S/Na atomic ratio of EX1.1 from ICP analysis is 1.04.

EX1.1 is according to the present invention.

Comparative Example 1.1

25.0 g of EX1.1 is added in a 1 L beaker with 600 g of deionized water so as to prepare a slurry. The slurry is stirred by a magnetic bar for 10 minutes as a washing step to decrease the content of each of the Na and S elements to less than 0.05 wt. %. The washed powder is separated from a solution by a filtering process and dried at 120° C. for 10 hours. The dried powder is labelled as CEX1.1.

CEX1.1 is not according to the present invention.

Comparative Example 1.2

CEX1.2 is prepared by a same procedure as EX1.1 except that the $Li_2SO_4$ powder is not added. The presence of the S element is originated from the co-precipitation process which uses a cobalt sulphate compound. The S/Na atomic ratio of CEX1.2 from ICP analysis is 0.60.

CEX1.2 is not according to the present invention.

Comparative Example 1.3

CEX1.3 is prepared according to the preparation of cathode active material in US 2017/0179479 A1 page 5 from [0087] to [0091]. A cobalt oxide powder is mixed with a $Li_2CO_3$ powder so as to prepare a mixture having Li/Co atomic ratio of 1.03. The mixture is calcined at 1000° C. in air atmosphere for 10 hours to obtain a calcined powder. 100 g of the calcined powder is mixed with 0.5 g of $Na_2SO_4$ then heated at 800° C. in air atmosphere for 10 hours. The heated product is a cathode active material having 0.5 wt. % $LiNaSO_4$ secondary phase and labelled as CEX1.3.

CEX1.3 is not according to the present invention.

Comparative Example 1.4

CEX1.4 is prepared by a same procedure as EX1.1 except that the $Li_2SO_4$ powder and $Na_2SO_4$ powder is mixed with a $Li_2CO_3$ powder so as to prepare a blend wherein the Li/Co atomic ratio is 1.00 and the S/Na atomic ratio is 1.46.

CEX1.4 is not according to the present invention.

Example 1.2

EX1.2 is prepared by a same procedure as EX1.1 except that the $Li_2SO_4$ powder and $Na_2SO_4$ powder is mixed with a $Li_2CO_3$ powder so as to prepare a blend wherein the Li/Co atomic ratio is 1.00 and the S/Na atomic ratio is 0.88.

EX1.2 is according to the present invention.

Example 2

A doped cobalt hydroxide carbonate precursor having a general formula $Co_{1.960}Al_{0.03}Mg_{0.01}(OH)_{2.06}CO_3$ is prepared by the process described in WO2018/162165 from page 5 line 4 to page 6 line 14. The process comprises the steps of mixing a Co source solution, a Mg source solution, an Al source solution, and a $Na_2CO_3$ solution in a precipitation reactor with a controlled temperature and pH.

Mg and Al are added as dopants.

Here, by using $CoSO_4$, $MgSO_4$, and $Al_2(SO_4)_3$ solutions as source of metals during the preparation of the $Co_2(OH)_2CO_3$ precursor, a side product $Na_2SO_4$ is synthetized, possibly formed according to the following chemical reaction: $1.96CoSO_4+0.03Al_2(SO_4)_3+0.01MgSO_4+Na_2CO_3+2.12NaOH\rightarrow Co_{1.960}Al_{0.03}Mg_{0.01}(OH)_{2.12}CO_3+2.06$ $Na_2SO_4$.

The precursor prepared according to the above-described process has a 20 μm median particle size and a Na content of 0.09 wt. %.

The doped cobalt hydroxide carbonate is heated at 600° C. for 10 hours so as to prepare a doped cobalt oxide. The doped cobalt oxide is mixed with $Li_2CO_3$ powder and $Li_2SO_4$ powder so as to prepare a blend wherein the Li/(Co+Al+Mg) atomic ratio is 1.00 and the S/Na atomic ratio is 1.00. The blend is fired at 1020° C. for 12 hours in a furnace so as to prepare a sintered powder. The sintered powder is de-agglomerated and screened by a milling equipment and sieving tool so as to prepare a doped LCO cathode active material powder labelled as EX2. The S/Na atomic ratio of EX2 from ICP analysis is 1.01.

EX2 is according to the present invention.

Comparative Example 2.1

25 g of EX2 is added in a 1 L beaker with 600 g of deionized water so as to prepare a slurry. The slurry is stirred by a magnetic bar for 10 minutes as a washing step as a washing to decrease the content of each of the Na and S elements to less than 0.05 wt. %. The washed powder is separated from a solution by a filtering process and dried at 120° C. for 10 hours.

The dried powder is labelled as CEX2.1.

CEX2.1 is not according to the present invention.

Comparative Example 2.2

CEX2.2 is prepared by a same procedure as EX2 except that the $Li_2SO_4$ powder is not added in the blending step. The presence of S originates from the use of a cobalt sulphate salt in the co-precipitation process (like in EX1.1). The S/Na atomic ratio of CEX2.2 from ICP analysis is 0.60.

CEX2.2 is not according to the present invention.

Comparative Example 3.1

According to EX3-P-3 of WO2018/162165, a cobalt comprising precursor powder having 25 wt. % of $CoCO_3$ and 75 wt. % of $Co_2(OH)_2CO_3$ can be prepared, as described in said document from page 18 line 8 to page 20 line 8. The precursor comprises Al dopant of 1.21 mol % with respect to the total molar contents of Co as obtained from ICP analysis.

The precursor according to the prior art has a median particle size of 22.9 μm and a Na content of 0.23 wt. %. According to WO2018/16165, the precursor is mixed with a $Li_2CO_3$ powder and a $Li_2SO_4$ powder so as to prepare a blend wherein the Li/(Co+Al) atomic ratio is 1.03 and the S/Na atomic ratio is 1.00. The blend is fired (or sintered) at 1000° C. for 12 hours in a furnace followed by grinding and sieving so as to prepare a sintered powder. The sintered powder is mixed with 0.5 mol % Ti with respect to the total molar contents of Co. The powder comprising Ti is fired at 750° C. for 6 hours in a furnace followed by grinding and sieving so as to prepare a LCO cathode active material powder labelled as CEX3.1.

Comparative Example 3.2

CEX3.2 is made according to the same method as CEX 2.1 except that CEX3.1 is used instead of EX2. The washed powder is separated from a solution by a filtering process and dried at 120° C. for 10 hours. The dried powder is labelled as CEX3.2.

3. Discussion

FIG. 2.1 shows an X-ray diffractogram comparison of EX1.1, CEX1.1, and CEX1.2. The layered structure of LCO with R-3m space group is identified by the presence of several diffraction peaks at a 2θ angle of 18.9°, 37.4°, 38.4°, and 39.1°. Additional diffraction peaks (besides those belonging to LCO) are observed at a 2θ angle of 16.1°, 22.5°, 23.2°, 29.5°, 30.4°, and 32.0° in EX1.1, which correspond to a trigonal crystal structure of a $LiNaSO_4$ secondary phase with a P31c space group. Hereby, the additional diffraction peaks indicate the formation of a $LiNaSO_4$ secondary phase in EX1.1. The same observation is obtained in FIG. 2.2 where the peaks relevant to the $LiNaSO_4$ secondary phase appear in EX2. From the X-ray diffraction, it is confirmed that a $LiNaSO_4$ secondary phase is formed for LCO compounds having a S/Na atomic ratio is superior or equal to 0.80 and inferior or equal to 1.20, preferably close to 1.00.

The comparison of discharge capacity fading trend from DQ1 to DQ25 is shown in FIG. 3. It is observed that EX1.1 has the highest DQ1 comparing with the example 2 and the comparative examples. The higher DQ1 of EX1.1 compared to EX2 is related with the presence of Al and Mg in LCO particles.

Two intersection points labelled as a first intersection point (IS1) and as a second intersection point (IS2) are defined in the FIG. 3. IS1 is the intersection point of EX1.1 and EX2 fading trend lines whereas IS2 is the intersection point of CEX1.2 and EX2 fading trend lines.

After 19 cycles (DQ19 corresponding to a capacity of 198.6 mAh/g), the discharge capacity of EX2 is higher than EX1.1. Likewise, DQ1 of CEX1.2 is higher than EX2. However, CEX1.2 has a worse capacity fading rate. After 12 cycles at IS2, the discharge capacity of EX1.1 is surpassed by EX2.

TABLE 2

Summary of examples and comparative examples composition and electrochemical properties

| | | Precursor | | Cathode (LCO) | | Molar | | | | |
| | | Na | S | Na | S | content | $LiNaSO_4$ | DQ1 | DQ25 | QF |
| Sample ID | M | (wt. %) | (wt. %) | (wt. %) | (wt. %) | S/Na | (wt. %) | (mAh/g) | (mAh/g) | (%/cycle) |
|---|---|---|---|---|---|---|---|---|---|---|
| EX1.1[&] | n/a | 0.118 | 0.112 | 0.108 | 0.156 | 1.04 | 0.59 | 221.2 | 191.6 | 0.56 |
| CEX1.1 | | 0.118 | 0.112 | 0.009* | 0.003* | 0.26 | 0.01 | 193.8 | 165.4 | 0.61 |
| CEX1.2 | | 0.118 | 0.112 | 0.105 | 0.093 | 0.64 | 0.37 | 217.9 | 185.8 | 0.61 |
| CEX1.3 | | 0.118 | 0.112 | 0.138 | 0.152 | 0.50 | 0.50 | 217.6 | 178.3 | 0.78 |
| CEX1.4 | | 0.118 | 0.112 | 0.153 | 0.311 | 1.46 | 0.84 | 213.4 | 183.6 | 0.61 |
| EX1.2[&] | | 0.118 | 0.112 | 0.201 | 0.246 | 0.88 | 0.97 | 222.4 | 202.5 | 0.39 |
| EX2[&] | Al, | 0.135 | 0.110 | 0.099 | 0.139 | 1.01 | 0.54 | 210.3 | 195.0 | 0.30 |
| CEX2.1 | Mg | 0.135 | 0.110 | 0.005* | 0.002* | 0.34 | 0.01 | 199.7 | 171.8 | 0.58 |
| CEX2.2 | | 0.135 | 0.110 | 0.100 | 0.090 | 0.65 | 0.36 | 205.1 | 186.7 | 0.37 |
| CEX3.1 | Al | 0.230** | — | 0.230** | 0.320** | 1.00** | 1.26 | 204.6 | 170.7 | 0.69 |
| CEX3.2 | | 0.230** | — | 0.010 | — | n.a.*** | 0.05 | 224.1 | 192.0 | 0.60 |

*A washing step is applied before the sintering step so as to remove the Na and S elements from the powderous mixture of a Li source and the precursor.

**As described in WO2018/162165.

***not measured.

[&]$LiNaSO_4$ secondary phase is of at least 0.4 wt. % and inferior or equal to 1.1 wt. % and has particles comprising a S/Na atomic ratio superior or equal to 0.80 and inferior or equal to 1.20.

Table 2 summarizes the composition and electrochemical properties of the examples and comparative examples. The ratio of S/Na and the LiNaSO$_4$ amount are calculated from ICP analysis. It is shown in this table that EX1.1 has a better cycle stability comparing to CEX1.1 and CEX1.2. EX1.1 also has a higher DQ1 and DQ25 comparing to CEX1.1 and CEX1.2. The higher first discharge capacity and better cycle stability are related to the presence of a proper amount of the LiNaSO$_4$ secondary phase in EX1.1. Accordingly, EX2 also shows a better cycle stability with the lower QF and higher DQ1 and DQ25, concluding the LiNaSO$_4$ secondary phase is beneficial to get a low capacity fading rate without sacrificing its capacity. The S/Na atomic ratio around 1 is preferable to form a LiNaSO$_4$ compound.

Figure 4:
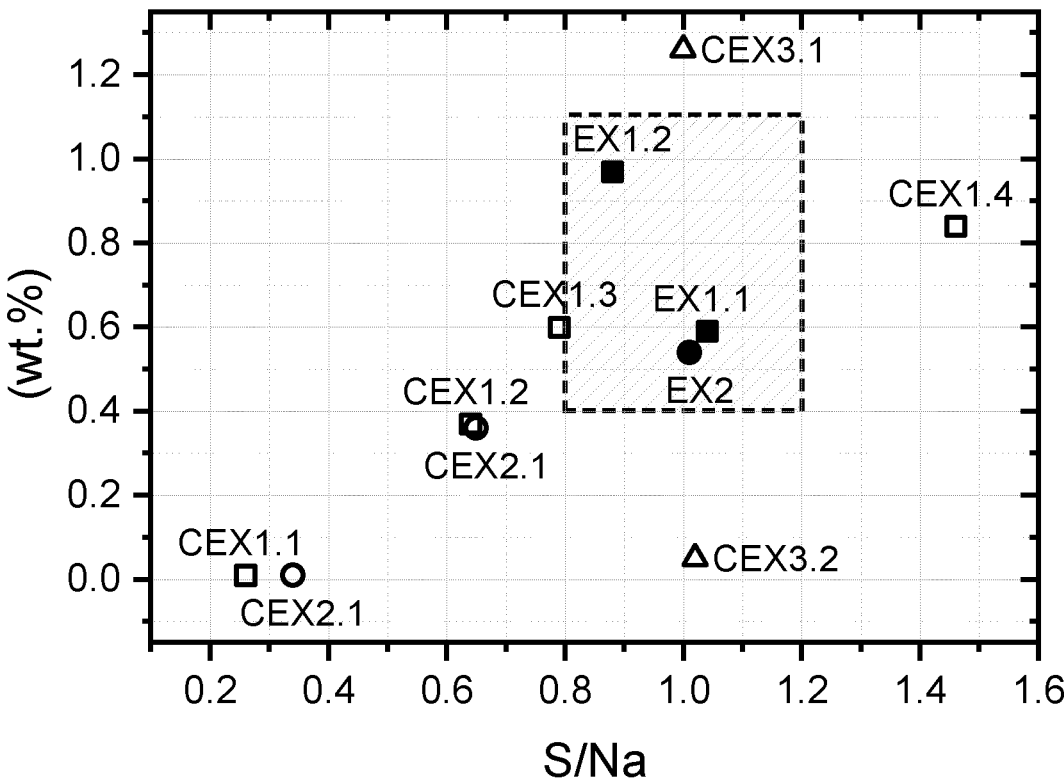
FIG. 4: Scatter plot showing S/Na ratio (x-axis) and LiNaSO$_4$ content in wt. % (y-axis) of each example and comparative examples. Shaded area is the claimed range according to this invention.

CEX3.1 and CEX3.2 are prepared according to the prior art WO2018/162165. CEX3.1 comprising 1.26 wt. % LiNaSO$_4$ shows DQ1 of 204.6 mAh/g and QF of 0.69%/ cycle. It shows that LiNaSO$_4$ amount higher than 1.1 wt. % as calculated by the method of this invention is not suitable to achieved the objective of this invention, i.e. DQ1 of higher than 210 mAh/g and an QF of lower than 0.60%/ cycle. CEX3.2, which is obtained by washing of CEX3.1 with water, comprises 0.05 wt. % LiNaSO$_4$ and shows poor cycle life. FIG. 4 mapped the S/Na ratio and LiNaSO$_4$ content of the examples and comparative examples. The shaded box indicating the claimed range according to this invention wherein EX1.1, EX1.2, and EX2 are located inside the range.

Figure 5:
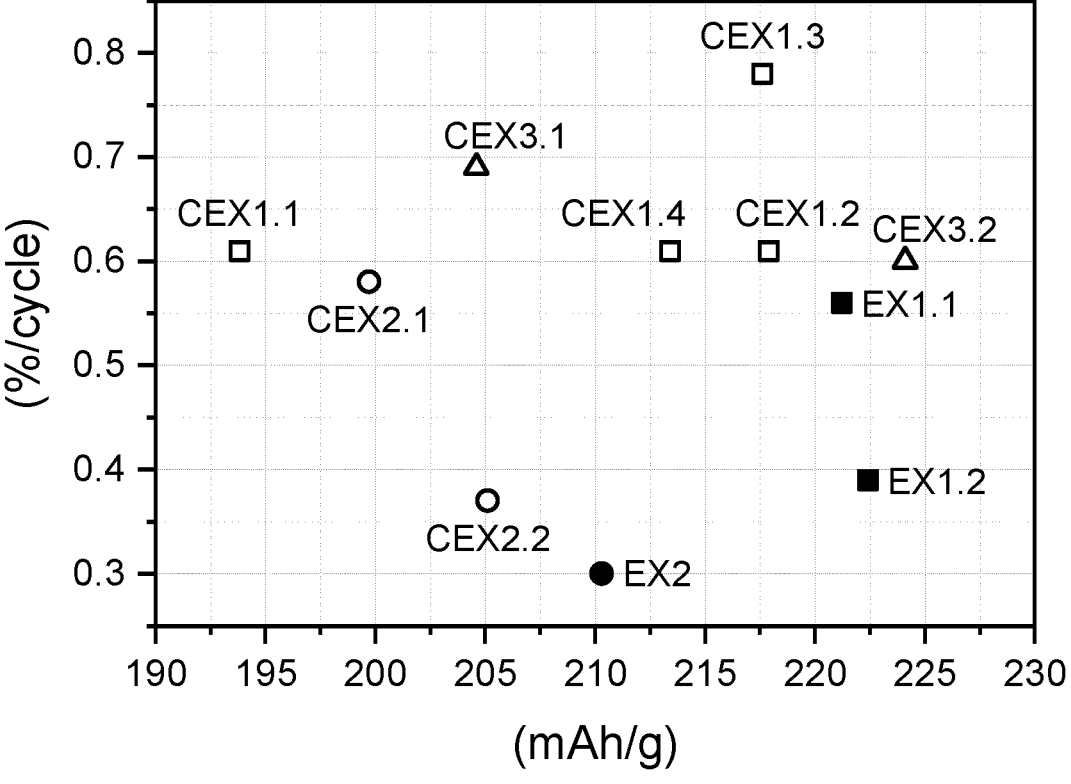
FIG. 5: Scatter plot showing DQ1 (x-axis) and QF (y-axis) of each examples and comparative examples.

FIG. 5 mapped the electrochemical properties DQ1 and QF of the examples and comparative examples wherein EX1.1, EX1.2, and EX2 show superior electrochemical properties in comparison with the comparative examples. EX1.1, EX1.2, and EX2 meet the objective of the present invention to provide a LCO cathode active material powder for lithium-ion secondary batteries, having subsequently an improved DQ1 of at least 210 mAh/g and an improved QF of at most 0.6% per cycle obtained by the analytical methods of the present invention.

The invention claimed is:

1. A lithium-ion secondary battery comprising a lithium cobalt-based oxide cathode active material powder having:
   a primary phase comprising Li, Co, and O, and
   a secondary phase comprising LiNaSO$_4$,
   wherein a content of said LiNaSO$_4$ secondary phase in said lithium cobalt-based oxide cathode active material powder is of at least 0.5 wt. % and inferior or equal to 1 wt. % with respect to a total weight of the lithium cobalt-based oxide cathode active material powder,
   said lithium cobalt-based oxide cathode active material powder being characterized in that it comprises a S/Na atomic ratio superior to 0.8 and inferior to 1.1.

2. The lithium-ion secondary battery comprising the lithium cobalt-based oxide cathode active material powder according to claim 1, wherein the content of said LiNaSO$_4$ secondary phase is superior or equal to 0.50 wt. % 0.5 wt. % and of at most 0.65 wt. %.

3. The lithium-ion secondary battery comprising the lithium cobalt-based oxide cathode active material powder according to claim 1, wherein said S/Na atomic ratio is superior or equal to 0.95 and inferior or equal to 1.05.

4. The lithium-ion secondary battery comprising the lithium cobalt-based oxide cathode active material powder according to claim 1, comprising at least one element of the group consisting of Al and Mg.

5. The lithium-ion secondary battery comprising the lithium cobalt-based oxide cathode active material powder according to claim 1, comprising a Li/Co atomic ratio superior or equal to 0.98 and inferior or equal to 1.02.

6. The lithium-ion secondary battery comprising the lithium cobalt-based oxide cathode active material powder according to claim 1, having a first discharge capacity at 4.6V (Li$^+$/Li) of at least 210mAh/g.

7. The lithium-ion secondary battery comprising the lithium cobalt-based oxide cathode active material powder according to claim 1, having a capacity fading rate at 4.6V (Li$^+$/Li) of less than 0.60%/cycle.

8. The lithium-ion secondary battery comprising a cathode active material comprising the lithium cobalt-based oxide cathode active material powder of claim 1.

9. A process for manufacturing the lithium-ion secondary battery comprising the lithium cobalt-based oxide cathode active material powder according to claim 1, comprising the steps of:
   providing a Co-based precursor powder having a Na content superior to 0.05 wt. % and inferior to 0.30 wt. % with respect to a total weight of said Co-based precursor powder,
   mixing said Co-based precursor powder with a source of Li, a source of S, and optionally, with a source of M', so as to prepare a mixture having a Li/Co atomic ratio superior or equal to 0.98 and inferior or equal to 1.02 and a S/Na atomic ratio superior er equal to 0.8 and inferior to 1.1,
   sintering said mixture at a temperature of at least 850° C. and inferior or equal to 1200° C., during a period of at least 5 hours in an oxygen containing atmosphere, so as to obtain a sintered agglomerated powder,
   milling said sintered agglomerated powder so as to obtain said lithium cobalt-based oxide cathode active material powder,
   wherein M' comprises at least element of the group consisting of: Mg, Al, Ni, Mn, Nb, Ti, W, and Zr.

10. A process for manufacturing the lithium-ion secondary battery comprising the lithium cobalt-based oxide cathode active material powder according to claim 1, comprising the steps of:
   providing a Co-based precursor powder having a S content superior to 0.05 wt. % and inferior to 0.30 wt. % with respect to a total weight of said Co-based precursor powder and a Na content superior to 0.05 wt. % and inferior to 0.30 wt. % with respect to a total weight of said Co-based precursor powder,
   mixing said Co-based precursor powder with a source of Li, and optionally, with a source of M', so as to prepare a mixture having a Li/Co atomic ratio superior or equal to 0.98 and inferior or equal to 1.02 and a S/Na atomic ratio superior to 0.8 and inferior to 1.1,
   sintering said mixture at a temperature of at least 850° C. and inferior or equal to 1200° C., during a period of at least 5 hours in an oxygen containing atmosphere, so as to obtain a sintered agglomerated powder,
   milling said sintered agglomerated powder so as to obtain said lithium cobalt-based oxide cathode active material powder,
   wherein M' comprises at least element of the group consisting of: Mg, Al, Ni, Mn, Nb, Ti, W, and Zr.

11. A process for manufacturing the lithium-ion secondary battery comprising the lithium cobalt-based oxide cathode active material powder according to claim 1, comprising the steps of:
   providing a Co-based precursor powder,
   mixing said Co-based precursor powder with a source of Li, a source of S, and a source of Na, and optionally, with a source of M', so as to prepare a mixture having a Li/Co atomic ratio superior or equal to 0.98 and inferior or equal to 1.02 and a S/Na atomic ratio superior to 0.8 and inferior to 1.1, sintering said mixture at a temperature of at least 850° C. and inferior or equal to 1200° C., during a period of at least 5 hours in an oxygen containing atmosphere, so as to obtain a sintered agglomerated powder, milling said sintered agglomerated powder so as to obtain said lithium cobalt-based oxide cathode active material powder, wherein M' comprises at least element of the group consisting of: Mg, Al, Ni, Mn, Nb, Ti, W, and Zr.

\* \* \* \* \*